UNITED STATES PATENT OFFICE.

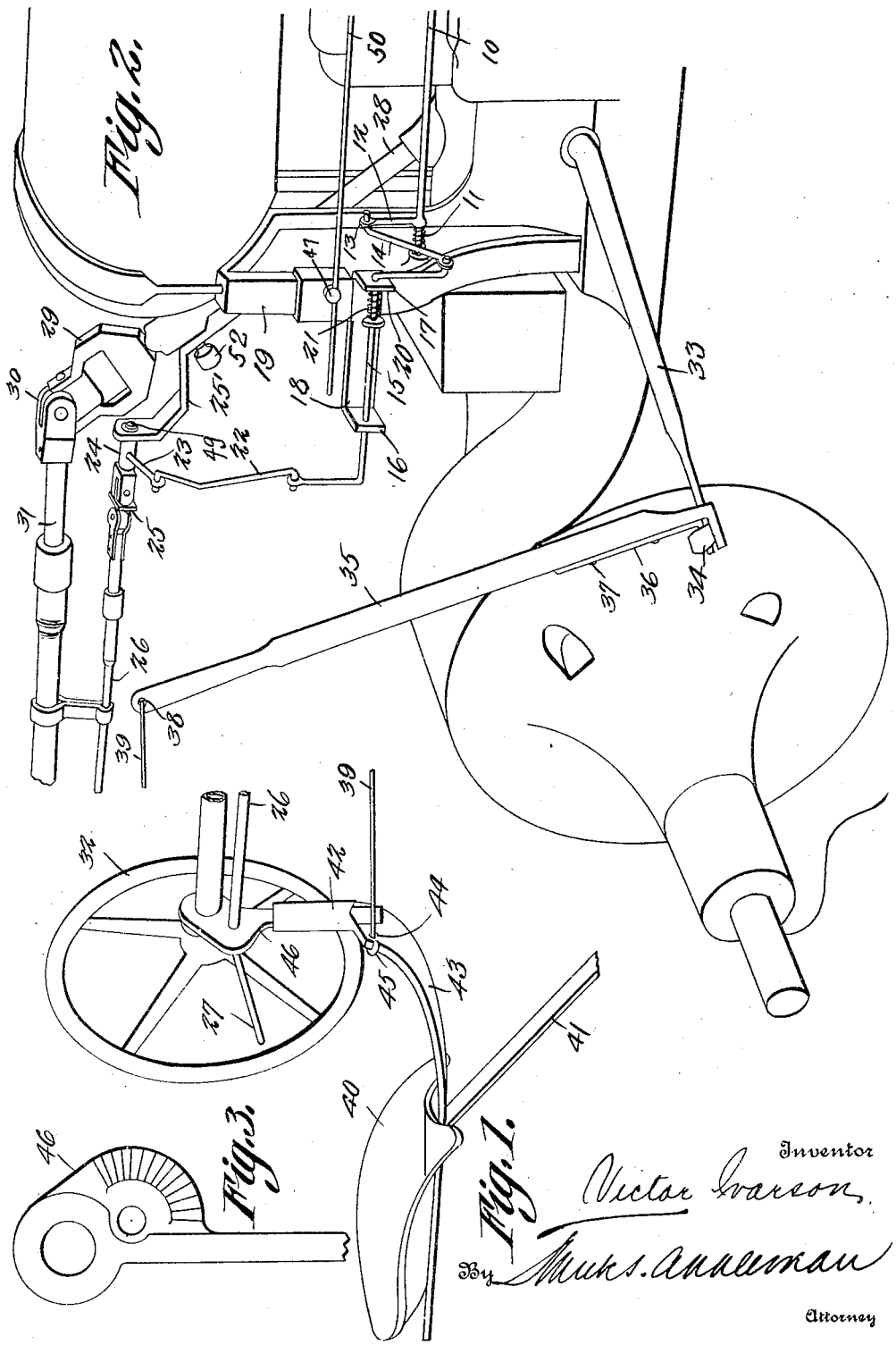

VICTOR IVARSON, OF CLEGHORN, IOWA, ASSIGNOR OF ONE-HALF TO WILLIAM F. HUTTON, OF CHEROKEE, IOWA.

TRACTOR.

1,329,711.     Specification of Letters Patent.     Patented Feb. 3, 1920.

Application filed June 10, 1919. Serial No. 303,157.

*To all whom it may concern:*

Be it known that I, VICTOR IVARSON, a citizen of the United States of America, and resident of Cleghorn, in the county of Cherokee and State of Iowa, have invented certain new and useful Improvements in Tractors, of which the following is a specification.

This invention relates to steering and controlling mechanism for a tractor, the said invention having for its object the provision of novel means whereby a steering and controlling mechanism may be applied to a tractor, and particularly a tractor of the Fordson type. The invention further includes novel means whereby this controlling mechanism may be supported from the trailer having a seat so that the controlling mechanism will be in proximity to and in convenient reach of an occupant of the seat of the trailer, the said invention also including means for increasing the lengths of the controlling means whereby they are adapted for use in connection with trailers which are close to or remote from the tractor.

A further object of this invention is to produce mechanism whereby the clutch steering post and the control for the fuel supply may be operated from the seat of the tractor.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in perspective of a fragment of a tractor seat with the mechanism support applied thereto;

Fig. 2 illustrates a perspective view of a fragment of a motor with the controlling mechanism associated with it; and Fig. 3 illustrates a view in elevation of a standard.

In these drawings 10 denotes a rotatably mounted rod which may have connection to a throttle of a tractor, the said rod being under the action of a spring 11 which is operative to return the rod to the normal position shown in the drawing.

There is an arm 12 rigid with the rod having an eye 13 for the reception of a link 14, which link has its opposite end connected to a crank 15 journaled in lugs 16 and 17 of a plate 18, which plate may be attached to the frame 19 of a tractor.

The crank 15 is likewise under tension of a spring 21 which is operative to return the crank to the normal position shown in Fig. 1.

The crank 15 has a link 22 connected to it and the said link also is pivotally connected to an arm 23 rigid with the rotatable shaft 24, which shaft is journaled in the bracket 25' at 49; and the said bracket is attached in suitable manner to the frame 19. The shaft 24 has a universal joint 25 and a section 26 which telescopes with relation to the inner end so that the shaft can thereby be lengthened to suit particular requirements. The outer end of the telescopic section carries an operating handle 27 and the said operating handle is used for the purpose of controlling the throttle through the instrumentalities just described.

The steering post 28 of the tractor has a coupling head 29 attached to its outer end and this coupling has a universal joint 30 connecting it to the steering shaft 31 which steering shaft is made up of two telescopically connected sections, the outer end of which is supplied with a wheel 32 by which the steering shaft may be rotated.

A clutch lever 33 has an extension 34 to which an arm 35 is connected by the clamping plate 36 which is attached to the said arm by fastenings 37 such as bolts, rivets or the like and the said arm 35 has an eye 38 at its upper end in which an operating rope or cable 39 is inserted, the said rope or cable extending outwardly within reach of an operator occupying the seat 40 which is on a trailer (not shown). The seat 40 has the usual supporting spring 41 and this is utilized as a support for the hollow standard 42 having an extension plate 43 which may be attached to the spring 41 or other seat standard commonly employed on trailers.

The plate 43 has an aperture 44 through which the operating rod 39 is slidable and the said operating rod terminates in a handle 45 which prevents it from disengaging the said plate.

The hollow standard 42 constitutes a support for the bracket 46 in which the steering shaft 31 and the section 26 of the controlling rod are journaled and the said standard has its face serrated to engage the handle 27 at different positions of adjustment so that the said handle which controls the fuel supply may be moved and held at different positions, as stated.

From an inspection of the drawing and from the foregoing description, it will be seen that an occupant of the seat 40 may turn the wheel 32 and thereby rotate or partially rotate the steering post or shaft and that the throttle may be operated through the medium of the handle 27 so that the supply of fuel may be increased or diminished according to the requirements of the tractor.

The clutch mechanism may be also under the control of the operator through the medium of the operating handle 45 and the rod of which it is an extension.

The bracket 25' is shaped to fit against the steering post 28 of the tractor and it is held in place by the grease cup 52. The said bracket 25' has the throttle rod 24 rotatably mounted in it.

The regular tractor throttle is disconnected at the joint 13 of the lever 12 and the throttle rod 14, which constitutes a part of the attachment is substituted for the regular throttle rod in the joint 13, thus forming the throttle connection between the tractor carbureter and the trailer through the lever 12 and rod 10 which latter is regular equipment on a tractor. The bracket which holds the improved throttle mechanism is fastened to the tractor by means of a pin 47 which is held in place by the regular tractor choker rod 50. The whole mechanism can be disconnected from the tractor and from the trailer by disconnecting the universal joint 29 and detaching the bracket 25', which latter is removable by taking out the grease cup and removing the throttle guide by moving the choker rod 50 through the pin 47 and disconnecting the throttle at the joint 13 and then by taking the side off of the trailer releases the standard member 43 and disconnecting clutch lever to joint 34 of the tractor.

As shown in the drawings, the positions of the clutch operating members are the positions they occupy when the clutch is disengaged and the tractor stopped. The clutch is disengaged by pulling on the member 39 which is fastened in the eye 44 of the post. By releasing the pull on the member 39, the clutch lever 33 on the tractor is free to be forced by the clutch springs into operative position to start the tractor, so that the said clutch is under control of the member 39.

From an inspection of the drawing, it will be apparent that the attachment can be readily applied to the seat of a trailer and to the controlling mechanism of a tractor, and that the tractor can be restored to its normal operating position by disconnecting the parts as described.

I claim:

1. In a tractor control, a hollow standard, means for supporting it from a trailer, a bracket carried by the said standard and having apertures therein, members rotatable in the said bracket, means for connecting one of the rotatable members to a steering post of a tractor, means for connecting the other of said rotatable members to a throttle of a tractor, a clutch operating lever, and means extending to the standard support for actuating the said means.

2. In a tractor control, a rotatably mounted rod adapted to be connected to a throttle, an arm on said rod, a link pivotally connected to the arm, a crank, means attached to a frame of a tractor for rotatably supporting the crank, a link for operating the said crank, a shaft having a telescopically connected extension, a bracket in which the shaft is rotatably mounted, said bracket having means of attachment to a frame of a tractor, a head connected to a steering shaft of a tractor, a shaft for rotating the head, a universal connection between the said shaft and head, a bracket in which the shafts are rotatably mounted, means for supporting the said bracket, and means adapted to be carried by a trailer for supporting the said last mentioned means.

3. In a tractor control, a rotatably mounted rod adapted to be connected to a throttle, an arm on said rod, a link pivotally connected to the arm, a crank, means attached to a frame of a tractor for rotatably supporting the crank, a link for operating the said crank, a shaft having a telescopically connected extension, a bracket in which the shaft is rotatably mounted, said bracket having means of attachment to a frame of a tractor, a head connected to a steering shaft of a tractor, a shaft for rotating the head, a universal connection between the said shaft and head, a bracket in which the shaft is rotatably mounted, a post for supporting the said bracket, a plate forming an extension of the said post, and means adapted to be carried by a trailer for supporting said plate.

VICTOR IVARSON.